July 23, 1929.  W. F. HERST  1,721,954
VALVE STRUCTURE
Filed Nov. 11, 1927
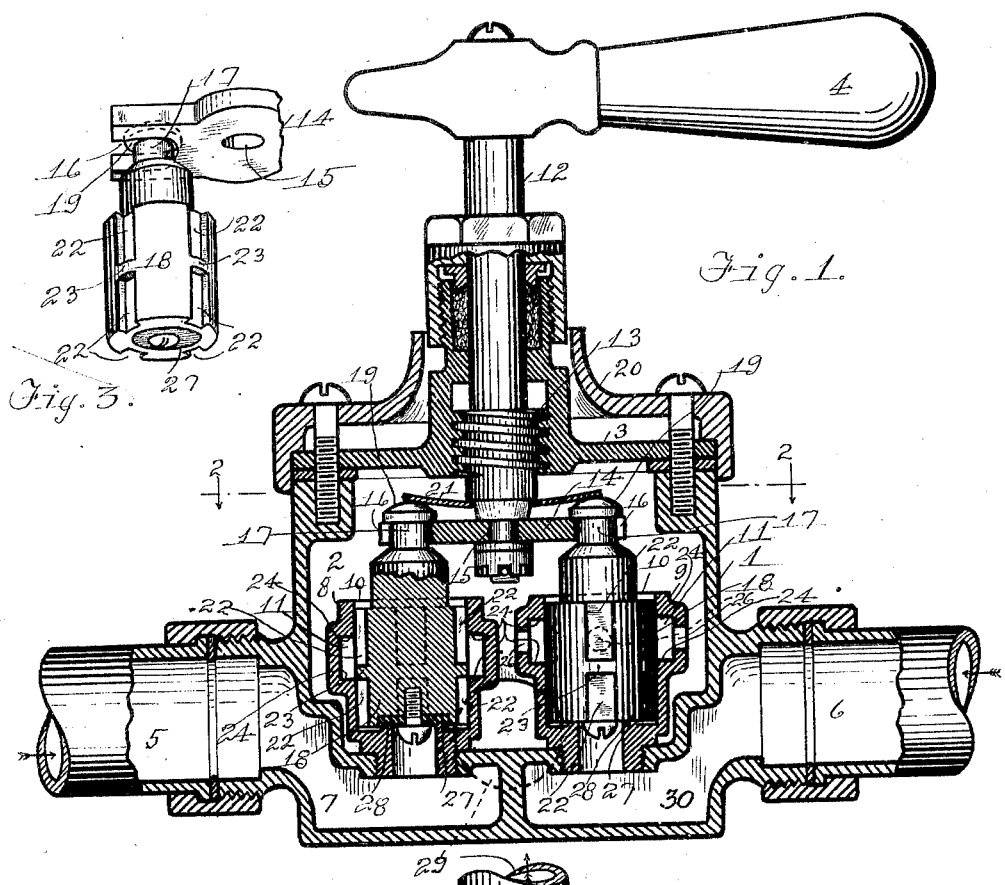
Fig. 1.
Fig. 3.
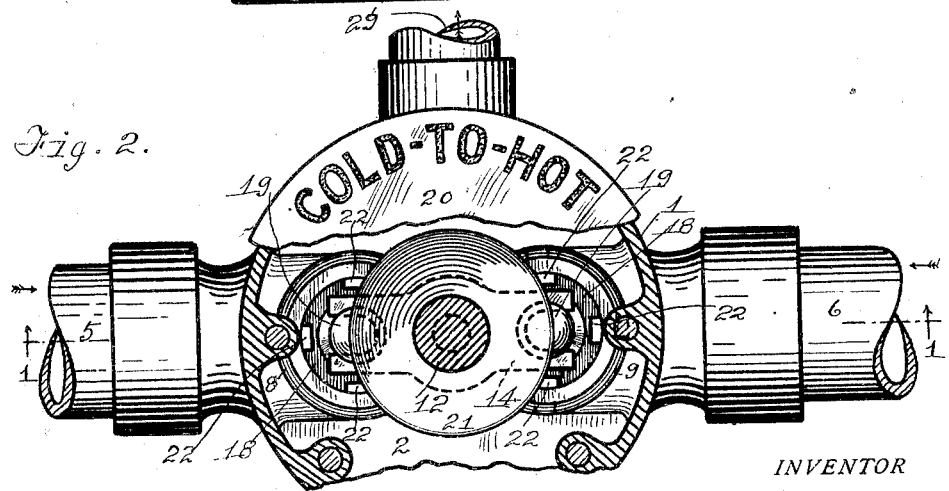
Fig. 2.
WITNESS:
G. E. Redding
INVENTOR
Ward F. Herst
BY
Cyrus W. Rice
ATTORNEY Patented July 23, 1929.

1,721,954

UNITED STATES PATENT OFFICE.

WARD F. HERST, OF GRAND RAPIDS, MICHIGAN, ASSIGNOR TO WOLVERINE BRASS WORKS, OF GRAND RAPIDS, MICHIGAN, A CORPORATION OF MICHIGAN.

VALVE STRUCTURE.

Application filed November 11, 1927. Serial No. 232,525.

The present invention relates to valve structures; and its object is, generally, to provide an improved structure of that character; and more particularly, to provide in such a structure certain parts which, however assembled, must operate in proper relation with each other; and further, to provide such a structure having a valve and valve-seat member with fluid passages arranged and controlled in an improved and very efficient manner; and further, to provide in such a structure a valve adapted to be readily mounted on its operating element and yieldingly held against movement on such element.

These and any other and more specific objects hereinafter appearing are attained by, and the invention finds preferable embodiment in, the valve structure hereinafter particularly described in the body of this specification and illustrated by the accompanying drawings, in which:—

Figure 1 is a side view of a valve structure partially sectioned on line 1—1 of Figure 2;

Figure 2 is a top plan view thereof partially sectioned on line 2—2 of Figure 1; and Figure 3 is a view in perspective of a valve and a portion of its mounting.

The structure illustrated by these drawings comprises a body portion 1 having a mixing chamber 2 whose open upper end is closed by an inner cap 3 and an outer cap 20 preferably displaying markings, as the spaced words "Cold" and "Hot" indicating the direction in which the operating handle 4 is to be turned to admit cold water or hot water into the mixing chamber. Cold water and hot water are supplied through the pipes 5, 6, and vented therefrom into the chambers 7, 30 respectively in said body portion. A plurality of parallelly disposed valve-seat members 8, 9 are provided for the flow therethrough of cold water and hot water respectively, each of said members having a passage or inlet to the mixing chamber comprising a longitudinal portion 10 and an enlargement thereof forming a communicating annular portion 11 around said longitudinal portion. An operating element, the rod 12, threaded at 13 in the cap 3 to effect its axial movement by turning of its handle 4, has at its lower end, inside the mixing chamber, a cross arm 14 pivotally mounted at its center at 15. The opposite ends of this cross bar are bifurcated to provide sockets 16 receiving the shank portions 17 of the valves 18, these shank portions having heads 19 pressed on the cross bar by a circular leaf spring 21 carried by said element 12 and operating to hold these valves yieldingly against axial movement in one direction, thus preventing their becoming loose in their sockets. These cross-sectionally round valves 18 fit in the longitudinal portions 10 of the passages through the valve-seat members, being slidable parallelly with each other in said portions by the axial movement of the operating element 12. These valves are identical in form and dimensions, are carried at the same distances from the rotary axis of the element 12 and are equally angularly spaced apart, thus corresponding to the positions of the valve-seat members 8, 9 so that these valves may interchangeably fit in said portions 10 of the passages through the valve seats. The valves have one or more longitudinal grooves 22 in their sides, each of said grooves having a wall 23 extending across the groove and slidably fitting in said longitudinal portions 10. These walls 23 being narrower than the width of the annular portions 11, it will be seen that when the valves are moved to a position wherein said walls are between and spaced from the opposite sides 24 of the annular portions, water will pass through the annular portions 11 and through the grooves 22 on the opposite sides of the walls 23 and thus into the mixing chamber; and that when the valve is moved to a position wherein the wall 23 is above or below the annular portion 11 the inlet to the mixing chamber will be closed; except that, in the case of the right-hand valve (i. e. the hot water controlling valve) in Figure 1, said inlet or passage is not closed unless this valve is moved downwardly to a position wherein said wall 23 is below said annular portion, for otherwise the hot water will pass out of the vents 26 from the bottom of the annular portion. These vents 26 in this valve are provided so that hot water may enter the mixing chamber during ordinary uses. It will also be seen that the valves may be moved to their lowest position wherein their ends 27 seat on the valve-seats 28, thus additionally and more positively closing the passage to the mixing chamber, whose outlet for the combined or mixed hot and cold water is shown at 29.

It will be seen that, the valves 18 being identical and the valve-seat members 8, 9 only being different, there can be no error made in assembling the valves and their carrying parts with said members, since the valves are so mounted relatively to such members as to interchangeably fit therein and cooperate therewith.

The invention being intended to be pointed out in claims is not to be limited to or by details of construction of the particular embodiment thereof illustrated by the drawings or hereinbefore described.

I claim:

1. In a valve structure of the character described: a body having a mixing chamber with an outlet; parallelly disposed valve-seat members each having an inlet to the chamber comprising a longitudinal portion with a radial enlargement in a part of its length forming a communicating annular portion therearound, the opposite sides of one of the annular portions being spaced in the longitudinal direction of said members from the corresponding opposite sides respectively of the other annular portion; an operating element movable in said direction; valves slidably fitting in said longitudinal portions and carried by said element in interchangeable operative relation with said members for controlling the inlets respectively.

2. In a valve structure of the character described: a body having a mixing chamber with an outlet; parallelly disposed valve-seat members each having an inlet to the chamber comprising a longitudinal portion with a radial enlargement in a part of its length forming a communicating annular portion therearound, the opposite sides of one of the annular portions being spaced in the longitudinal direction of said members from the corresponding opposite sides respectively of the other annular portion; an operating element movable in said direction; valves slidably fitting in said longitudinal portions and carried by said element at the same distances from its longitudinal axis in equally angular spaced relation with each other and in interchangeable operative relation with said members for controlling the inlets respectively.

3. In a valve structure of the character described: a body having a mixing chamber with an outlet; parallelly disposed valve-seat members each having an inlet to the chamber comprising a longitudinal portion with a radial enlargement in a part of its length forming a communicating annular portion therearound, the opposite sides of one of the annular portions being spaced in the longitudinal direction of said members from the corresponding opposite sides respectively of the other annular portion; an operating element movable in said direction and having a cross arm turnable about said element's longitudinal axis; valves slidably fitting in said longitudinal portions and carried by the cross arm at equal distances from said longitudinal axis and in equally angular spaced relation with each other thereabout and in interchangeable operative relation with said members for controlling the inlets respectively 4. In a valve structure: a valve-seat member having a passage comprisig a longitudinal portion and an annular portion therearound; a valve slidably fitting in the longitudinal portion and having a longitudinal groove in its side provided with a wall extending across the same and slidably fitting in said longitudinal portion, the valve being movable to positions wherein said wall closes said passage and to another position wherein said wall is spaced from and between the opposite sides of said annular portion to open the passage.

5. In a valve structure: a valve-seat member having a passage comprising a longitudinal portion and an annular portion therearound provided with a vent from said annular portion; a valve slidably fitting in the longitudinal portion and having a longitudinal groove in its side provided with a wall extending across the same and slidably fitting in said longitudinal portion, the valve being movable to positions wherein said wall closes said passage and to another position wherein said wall is spaced from and between the opposite sides of said annular portion to open the passage.

6. In a valve structure: a valve-seat member having a valve-seat and a passage comprising a longitudinal portion and an annular portion therearound; a valve slidably fitting in the longitudinal portion and having a longitudinal groove in its side provided with a wall extending across the same and slidably fitting in said longitudinal portion, the valve being movable to positions wherein said wall closes said passage and to another position wherein said wall is spaced from and between the opposite sides of said annular portion to open the passage and the valve also being movable to seating position on the valve-seat.

7. In a valve structure of the character described: a longitudinally movable valve-operating element having a laterally extending arm provided with a socket; a valve having a longitudinal shank portion seated in the socket and provided with a head; a leaf spring carried by said element and pressing the head into contact with the arm.

8. In a valve structure of the character described: a body having a mixing chamber with an outlet; a longitudinally movable valve-operating element having a cross arm turnable about said element's longitudinal axis and having sockets at equal distances from said axis; valve seat members having passages to the chamber extending parallelly with said axis; valves slidably fitting in said passages and having heads and shank portions seated in the sockets; a circular leaf spring carried by said element and pressing the heads into contact with the cross arm.

In testimony whereof I have hereunto set my hand at Grand Rapids, Michigan, this 7th day of November, 1927.

WARD F. HERST.